United States Patent Office 3,274,217
Patented Sept. 20, 1966

3,274,217
HALO-SUBSTITUTED TETRACYANOOCTAHY-
DROALKANONAPHTHALENES
Robert A. Dombro, Chicago, Ill., assignor to Universal
Oil Products Company, Des Plaines, Ill., a corporation
of Delaware
No Drawing. Filed May 29, 1963, Ser. No. 284,000
6 Claims. (Cl. 260—346.2)

This invention relates to novel compositions of matter comprising halo-substituted tetracyanooctahydroalkanonaphthalenes and to a method for the preparation thereof. More particularly the invention relates to novel compositions of matter which are prepared by condensing conjugated alkadienes or cycloalkadienes with tetracyanoethylene and thereafter condensing the adduct with a halo-substituted cycloalkadiene to form the desired products.

It has now been discovered that novel compositions of matter comprising halo-substituted tetracyanooctahydroalkanonaphthalene may be prepared in a manner hereinafter set forth in greater detail. The desired products will find a wide variety of uses in the chemical field, especially as insecticides. For example, 5,6,7,8,9,9-hexachloro-2,2,3,3-tetracyano - 1,4,5,8 - dimethano - 1,2,3,4,4a,5,8,8a-octahydronaphthalene, due to its particular configuration and the presence of chlorine atoms on the ring, will be an effective insecticide, especially against houseflies. In addition, the compounds, of this invention may also be utilized as intermediates in the preparation of other organic compounds such as pharmaceuticals, resins, plastics, etc.

It is therefore an object of this invention to provide a process for the preparation of halo-substituted tetracyanooctahydroalkanonaphthalene.

A further object of this invention is to provide a process for the preparation of novel compositions of matter of a type hereinafter set forth in greater detail which may be utilized in certain commercial fields, especially as insecticides.

Taken in its broadest aspect one embodiment of this invention resides in a process for the preparation of a halo - substituted tetracyanooctahydroalkanonaphthalene which comprises condensing a compound selected from the group consisting of conjugated alkadienes and cycloalkadienes with tetracyanoethylene at condensation conditions, thereafter further condensing the resultant adduct with a holo-substituted cycloalkadiene at condensation condensation conditions, and recovering the desired halo-substituted tetracyanoctahydroalkanonaphthalene.

A further embodiment of this invention is found in a process for the preparation of a halo-substituted by tetracyanooctahydroalkanonaphthalene which comprises condensing cyclopentadiene with tetracyanoethylene at a temperature in the range of from about 0° to about 25° C., thereafter further condensing the resultant adduct with a halo-substituted cycloalkadiene at a temperature in the range of from about 50° to about 250° C. and at a pressure in the range of from about atmospheric to about 100 atmospheres, and recovering the desired halo-substituted tetracyanooctahydroalkanonaphthalene.

Yet another embodiment of this invention is found in a halo-substituted tetracyanooctahydroalkanonaphthalene.

A specific embodiment of this invention resides in a process for the preparation of a halo-substituted tetracyanooctahydroalkanonaphthalene which comprises condensing cyclopentadiene with tetracyanoethylene at a temperature in the range of from about 0° to about 25° C., thereafter further condensing the resultant 5,5,6,6-tetracyanonorborn-2 - ene with hexachlorocyclopentadiene at a temperature in the range of from about 50° to about 250° C., and recovering the desired 5,6,7,8,9,9-hexachloro - 2,2,3,3 - tetracyano - 1,4,5,8 - dimethano - 1,2,3,4, 4a, 5,8,8a-octahydronaphthalene.

Another specific embodiment of this invention is found in 5,6,7,8,9,9 - hexachloro - 2,2,3,3 - tetracyano-1,4,5,8-dimethano-1,2,3,4,4a,5,8,8a-octahydronaphthalene.

Other objects and embodiments will be found in the following further detailed description of this invention.

As hereinbefore set forth, it has now been discovered that halo-substituted tetracyanooctahydroalkanonaphthalenes may be prepared by condensing tetracyanoethylene with a compound selected from the group consisting of conjugated alkadienes and conjugated cycloalkadienes to form tetracyanocycloalkenes, and thereafter further condensing the adduct with a halo-substituted cycloalkadiene to form the desired product. The following terms when used in the present specification and appended claims such as "halo-substituted cycloalkadiene" will refer to both mono- and polyhalo-substituted cycloalkadienes, the term "octahydroalkanonaphthalenes" will refer to both monoalkano and di-alkano naphthalenes, said naphthalenes containing nuclearly substituted or bridge radicals such as alkyl, halo, epoxy, imino, thioxy radicals, etc.

The aforementioned condensation reactions are of the Diels-Alder type and are effected at condensation conditions depending upon the reactants which are utilized. For example, the condensation of the tetracyanoethylene with the conjugated alkadiene or cycloalkadiene is effected at temperatures sub-atmospheric in nature, said temperatures ranging from about 0° to about 20° C., the aforesaid sub-atmospheric temperatures being effected by the use of external cooling means such as ice baths, etc. The condensation between the adduct prepared in the initial step and the halo-substituted cycloalkadienes is then effected at elevated temperatures ranging from about 75° up to about 200° C. or more, the preferred arange usually being from about 100° to about 180° C. It is also contemplated within the scope of this invention that the latter condensation may be effected at elevated pressures in addition to the elevated temperature. For example, pressures ranging from 2 to about 100 atmospheres or more may be used if higher temperatures than those hereinbefore set forth are used, the pressure being that which is sufficient to maintain a major portion of the reactants in the liquid phase. Both the initial step and the second step of the process of this invention are effected in the presence of a substantially inert organic solvent. Examples of solvents which may be used in the process of this invention includes aromatic hydrocarbons such as benzene, toluene, o-xylene, m-xylene, p-xylene, ethylbenzene, etc.; paraffinic hydrocarbons which are acyclic in nature such as pentane, hexane, heptane, etc.; cyclic in nature such as cyclopentane, methylcyclopentane, cyclohexane, cycloheptane, etc.; alcohols such as methyl alcohol, ethyl alcohol, n-propyl alcohol, isopropyl alcohol, butyl alcohol, etc.; ethers such as methyl ether, ethyl ether, propyl ether, etc.; acetone, etc.

The initial step of the process of the present invention involves the condensation of tetracyanoethylene with a conjugated alkadiene or cycloalkadiene. Diolefinic conjugated hydrocarbons containing only carbon and hydrogen atoms which may be reacted with the tetracyanoethylene in the process of the present invention include (1) acyclic conjugated diolefins having the general formula:

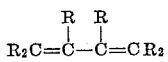

in which the R's are independently selected from the group consisting of alkyl or hydrogen radicals, at least one R of each of the double bonded carbon atoms being hydrogen; or (2) conjugated cycloalkadienes having the general formula:

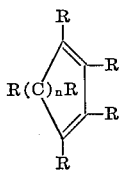

in which the R's are independently selected from the group consisting of hydrogen or alkyl radicals and $n$ is one or two. Examples of these compounds include conjugated alkadienes such as 1,3-butadiene,
2-methyl-1,3-butadiene (isoprene),
2,3-dimethyl-1,3-butadiene,
1,3-pentadiene,
2-methyl-1,3-pentadiene,
3-methyl-1,3-pentadiene,
2,3-dimethyl-1,3-pentadiene,
2-ethyl-1,3-pentadiene,
3-ethyl-1,3-pentadiene,
2,4-hexadiene,
3-methyl-2,4-hexadiene,
3,4-dimethyl-2,4-hexadiene,
3-ethyl-2,4-hexadiene,
3,4-diethyl-2,4-hexadiene,
1,3-hexadiene,
2-methyl-1,3-hexadiene,
3-methyl-1,3-hexadiene,
2-ethyl-1,3-hexadiene,
3-ethyl-1,3-hexadiene,
2,3-diethyl-1,3-hexadiene,
2,4-heptadiene,
3-methyl-2,4-heptadiene,
4-methyl-2,4-heptadiene,
3,4-dimethyl-2,4-heptadiene,
3-ethyl-2,4-heptadiene,
4-ethyl-2,4-heptadiene,
3,4-diethyl-2,4-heptadiene,
1,3-heptadiene,
2-methyl-1,3-heptadiene,
3-methyl-1,3-heptadiene,
2,3-dimethyl-1,3-heptadiene,
2-ethyl-1,3-heptadiene,
3-ethyl-1,3-heptadiene,
2,3-diethyl-1,3-heptadiene, etc.;

cycloalkadienes and alkyl substituted cycloalkadienes such as 1,3-cyclopentadienes which for purposes of this invention will be designated as cyclopentadienes and include cyclopentadiene,
1-methylcyclopentadiene,
2-methylcyclopentadiene,
5-methylcyclopentadiene,
1,2-dimethylcyclopentadiene,
1,3-dimethylcyclopentadiene,
5,5-dimethylcyclopentadiene,
1,2,3-trimethylcyclopentadiene,
1,2,3,4-tetramethylcyclopentadiene,
hexamethylcyclopentadiene,
1-ethylcyclopentadiene,
2-ethylcyclopentadiene,
5-ethylcyclopentadiene,
1,2-diethylcyclopentadiene,
1,3-diethylcyclopentadiene,
5,5-diethylcyclopentadiene,
1,2,3-triethylcyclopentadiene,
1,2,3,4-tetraethylcyclopentadiene,
hexaethylcyclopentadiene, etc.

It is also contemplated within the scope of this invention that conjugated cycloalkadienes such as 1,3-cyclohexadiene,
1-methyl-1,3-cyclohexadiene,
2-methyl-1,3-cyclohexadiene,
5-methyl-1,3-cyclohexadiene,
1,2-dimethyl-1,3-cyclohexadiene,
1,3-dimethyl-1,3-cyclohexadiene,
1,4-dimethyl-1,3-cyclohexadiene,
5,6-dimethyl-1,3-cyclohexadiene,
1,2,3-trimethyl-1,3-cyclohexadiene,
1,2,4-trimethyl-1,3-cyclohexadiene,
1,4,5-trimethyl-1,3-cyclohexadiene,
1,5,6-trimethyl-1,3-cyclohexadiene, etc.

may also be used although not necessarily with equivalent results. In addition, it is also contemplated within the scope of this invention that unsaturated compounds containing a halogen substituent may also be reacted with the tetracyanoethylene according to the process of the present invention, said compounds including (1) halogenated conjugated straight-chain diolefins containing only carbon, hydrogen and halogen atoms having the general formula:

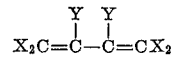

in which the X's are independently selected from the group consisting of hydrogen or halogen radicals having an atomic weight of from 35 to 127 (i.e., chlorine, bromine or iodine), at least one of the X's being halogen and Y is independently selected from the group consisting of alkyl, haloalkyl, halogen and hydrogen radicals, or (2) halogenated conjugated cycloalkadienes containing only carbon, hydrogen and halogen atoms and having the general formula:

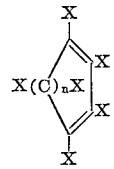

in which the X's have the same meaning as above and $n$ is 1 or 2. Examples of these compounds include haloalkadienes such as 1-chloro-1,3-butadiene,
1,3-dibromo-1,3-butadiene,
1,2-diiodo-1,3-butadiene,
1,1,2-trichloro-1,3-butadiene,
1,1,4,4-tetrabromo-1,3-butadiene,
1,1,2,3,4-pentaiodo-1,3-butadiene,
1,3-dichloro-2-methyl-1,3-butadiene,
1,1,4-tribromo-2-methyl-1,3-butadiene,
1,1,4,4-tetraiodo-2-methyl-1,3-butadiene, etc.,
1-chlorocyclopentadiene,
1,2-dichlorocyclopentadiene,
1,2,3-trichlorocyclopentadiene,
hexachlorocyclopentadiene,
1,2,3,4-tetrabromocyclopentadiene,
1,2,3,4,5-pentaiodocyclopentadiene,
1,2-dichloro-1,3-cyclohexadiene,
octachloro-1,3-cyclohexadiene,
1,2,3-tribromo-1,3-cyclohexadiene,
1,1-dichloro-3-bromo-1,3-butadiene,
1-chloro-3-bromo-1,3-butadiene,
1,2-dichloro-5,5-dibromocyclopentadiene, etc.

may be used although not necessarily with equivalent results. Other conjugated cyclic dienes which may also be utilized in the process of this invention include heterocyclic dienes such as furan, thiophene, pyrrole and α,α'-substituted furans, thiophenes and pyrroles, said substituents being selected from the group consisting of halogen radicals (said halogen having an atomic weight of between 35 and 80, such as chlorine and bromine) and alkyl radicals containing from 1 to about 4 carbon atoms, said alkyl radicals containing only carbon and hydrogen atoms.

The resultant adducts, examples of which include 5,5,6,6-tetracyanonorborn-2-ene,
4,4,5,5-tetracyanocyclohexene-1,
4,4,5,5-tetracyano-3-methylcyclohexene-1,
4,4,5,5-tetracyano-3-chlorocyclohexene-1,
5,5,6,6-tetracyanobicyclo-[2,2,2]-2-octene,
3,6-epoxy-4,4,5,5-tetracyano-1-cyclohexene,
3,6-imino-4,4,5,5-tetracyano-1-cyclohexene,
3,6-thioxy-1-cyclohexene,
1,2,3,4,7,7-hexachloro-5,5,6,6-tetracyanonorborn-2-ene, etc.

are then condensed with a halo-substituted cycloalkadiene. Examples of halo-substituted conjugated cycloalkadienes which may be used include halogenated 1,3-cyclopentadienes which for purposes of this invention will be designated as halogenated cyclopentadienes including 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc.

It is also contemplated within the scope of this invention that polyhalo-substituted conjugated cyclohexadienes such as 1,2-dichloro-1,3-cyclohexadiene,
1,2,3-trichloro-1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,2-cyclohexadiene,
1,2-diiodo-1,3-cyclohexadiene,
1,2,3-triiodo-1,3-cyclohexadiene,
octaiodo-1,3-cyclohexadiene, etc., may also be used. In addition, it is also contemplated that polyhaloalkadienes and polyhalocycloalkadienes which are used in this process may contain more than one species of halo substituents, such as, for example, 1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may be used although not necessarily with equivalent results. It is to be understood that the aforementioned conjugated diolefinic compounds, both acyclic and cyclic in nature are only representatives of the class of compounds which may be used in both steps of the condensation process and that the present invention is not necessarily limited thereto.

The process of this invention may be effected in any suitable manner and may comprise either a batch or continuous type operation. For example, when a batch type operation is used, a quantity of the tetracyanoethylene and the solvent of the type hereinbefore set forth are placed in a condensation apparatus provided with stirring and cooling means. The mixture is stirred and cooled until the tetracyanoethylene is completely dissolved in the solvent. At this point the conjugated diolefinic compound also of the type hereinbefore set forth is slowly added dropwise while the temperature of the flask and contents thereof is maintained in a sub-atmospheric state. Upon completion of the desired residence time the flask and contents thereof are allowed to warm to room temperature and the reaction mixture is filtered to remove side reaction products which may have occurred during the condensation. Following this the filtrate is treated with an organic solvent followed by concentration and cooling. The desired product is crystallized out and recovered.

The desired adduct which is recovered from the above step is then placed in a second condensation apparatus provided with a distilling column and condenser. The halo-substituted cycloalkadiene along with the desired solvent are added thereto and the mixture is thereafter heated to the desired reaction temperature. If so desired, the second condensation step may be effected under sub-atmospheric pressures, the halo-substiutted cycloalkadiene and the adduct being placed in an appropriate condensation apparatus such as a rotating autoclave. The autoclave is sealed, heated to the desired reaction temperature and brought to the desired reaction pressure by charging an inert gas such as nitrogen into the autoclave. Upon completion of the desired residence time the condensation apparatus and contents thereof are allowed to cool to room temperature. The reaction product is then treated in a manner set forth above and the desired halo-substituted tetracyanooctahydroalkanonaphthalene is separated and recovered.

It is also contemplated within the scope of this invention that the process may be effected in a continuous manner of operation. When such an operation is used, a quantity of the starting materials comprising the tetracyanoethylene which has been dissolved in a solvent and the conjugated alkadiene or cycloalkadiene are continuously charged to a reaction zone which is maintained at the proper operating conditions of temperature and pressure, the temperature in this gas being sub-atmospheric in nature. Upon completion of the desired residence time the reactor effluent is withdrawn, separated from unreacted starting materials and/or side reaction products which may have occurred and charged to a second reaction zone which is also maintained at the proper operating conditions of temperature and pressure. In addition, the halo-substituted cycloalkadiene which is to be condensed with the adduct is continuously charged to said second reaction zone through separate lines or, if so desired, may be admixed with the adduct before entry into said second reaction zone and charged thereto in a single stream. In addition, the substantially inert organic solvent of the type previously set forth which was continuously charged to said reaction zone through a separate line or, if so desired, in admixture with one or both of the starting materials for the second condensation. Upon completion of the desired residence time the reactor effluent from the second reaction zone is withdrawn, separated from unreacted starting materials and/or side products and recovered by conventional means such as fractional distillation, crystallization, etc.

The physical properties of the present halo-substituted tetracyanooctahydroalkanonaphthalenes and the effects they have on entomological forms of life make them particularly desirable as insecticides and insect repellents, the compounds having many of the features desired of materials of this purpose. They are, for example, toxic to insects which are destructive to plant life and materials effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficient limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article, for example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

Examples of halo substituted tetracyanooctahydroalkanonaphthalenes which may be prepared according to the process of this invention possess the generic formulae:

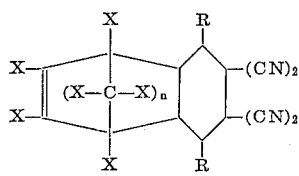

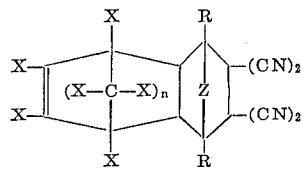

in which X is selected from the group consisting of hydrogen and halogen radicals having an atomic weight of between 35 and 80 (i.e., chlorine and bromine), at least one X being halogen, R in selected from the group consisting of hydrogen, halogen and alkyl radicals containing from 1 to about 3 carbon atoms, Z is selected from the group consisting of oxy, thioxy, imino and alkyl radicals containing from 1 to 3 carbon atoms and $n$ is an integer of from 1 to 2. Specific examples of these compounds include 5,6,7,8,9,9-hexachloro-2,2,3,3-tetracyano-5,8-methano-1,2,3,4,4a,5,8,8a-octahydronaphthalene,
5,6,7,8,9,9-hexachloro-2,2,3,3-tetracyano-1,4,5,8-dimethano-1,2,3,4,4,4a,5,8,8a-octahydronaphthalene,
5,6,7,8,9,9-hexachloro-2,2,3,3-tetracyano-5,8-methano-1,2,3,4,4a,5,8,8a-octahydro-1-methylnaphthalene,
5,6,7,8,9,9-hexachloro-2,2,3,3-tetracyano-1,4,5,8-dimethano-1,2,3,4,4a,5,8,8a-octahydro-1-methylnaphthalene,
5,6,7,8,9,9-hexachloro-2,2,3,3-tetracyano-5,8-methano-1,4-ethano-1,2,3,4,4a,5,8,8a-octahydronaphthalene,
1,5,6,7,8,9,9-heptachloro-2,2,3,3-tetracyano-5,8-methano-1,2,3,4,4a,5,8,8a-octahydronaphthalene,
1,5,6,7,8,9,9-heptachloro-2,2,3,3-tetracyano-1,4,5,8-dimethano-1,2,3,4,4a,5,8,8a-octahydronaphthalene,
1,4,5,6,7,8,9,9-octachloro-2,2,3,3-tetracyano-5,8-methano-1,2,3,4,4a,5,8,8a-octahydronaphthalene,
1,4,5,6,7,8,9,9-octachloro-2,2,3,3-tetracyano-1,4,5,8-dimethano-1,2,3,4,4a,5,8,8a-octahydronaphthalene,
5,6,7,8,9,9-hexachloro-1,4-epoxy-5,8-methano-1,2,3,4,4a,5,8,8a-octahydronaphthalene,
5,6,7,8,9,9-hexachloro-1,4-thioxy-5,8-methano-1,2,3,4,4a,5,8,8a-octahydronaphthalene,
5,6,7,8,9,9-hexachloro-1,4-imino-5,8-methano-1,2,3,4,4a,5,8,8a-octahydronaphthalene,
5,6,7,8,9,9-hexabromo-2,2,3,3-tetracyano-5,8-methano-1,2,3,4,4a,5,8,8a-octahydronaphthalene,
5,6,7,8,9,9-hexabromo-2,2,3,3-tetracyano-5,8-methano-1,2,3,4,4a,5,8,8a-octahydro-1-methylnaphthalene,
5,6,7,8,9,9-hexabromo-2,2,3,3-tetracyano-5,8-methano-1,4-ethano-1,2,3,4,4a5,8,8a-octahydronaphthalene,
1,5,6,7,8,9,9-heptabromo-2,2,3,3-tetracyano-1,4,5,8-dimethano-1,2,3,4,4a,5,8,8a-octahydronaphthalene,
1,4,5,6,7,8,9,9-octabromo-2,2,3,3-tetracyano-1,4,5,8-dimethano-1,2,3,4,4a,5,8,8a-octahydronaphthalene,
5,6,7,8,9,9-hexabromo-1,4-thioxy-5,8-methano-1,2,3,4,4a,5,8,8a-octahydronaphthalene, etc.

The following examples are given to illustrate the process of the present invention which, however, are not intended to limit the generally broad scope of the present invention in strict accordance therewith.

*Example I*

In this experiment a 500 cc. condensation flask was equipped with a magnetic stirrer, a cooling bath and a dropping funnel. To this flask was added 8 grams (0.062 mole) of tetracyanoethylene and 150 cc. of acetone as the solvent. The mixture was then stirred and cooled until complete solution of the tetracyanoethylene in the solvent was obtained at a temperature of about 98° C. At this point 20 grams (0.3 mole) of freshly prepared cyclopentadiene which was obtained by the thermal decomposition of dicyclopentadiene was slowly added dropwise over a period of about 15 minutes while continuously stirring the reaction mixture. During this period the temperature rose to a maximum of 17° C. Stirring was continued for an additional half hour at the end of which time the reaction mixture was filtered to remove traces of dark particles. Normal heptane was added to the filtrate after which the solvent was evaporated and the mixture cooled. Upon cooling 7 grams of colorless well-formed crystals having a melting point of 218°–222° C. were recovered. The mother liquor was treated with decolorizing carbon, again concentrated and cooled. An additional amount of 2.2 grams of almost colorless crystals were obtained, said crystals having a melting point of 215°–220° C. These crystals comprised 5,5,6,6-tetracyanonorborn-2-ene.

To a glass liner of a rotating autoclave was charged 9 grams of the 5,5,6,6-tetracyanonorborn-2-ene prepared in the above paragraph, 24 grams of hexachlorocyclopentadiene, 44.5 grams of n-heptane and 2 grams of anhydrous potassium carbonate. The autoclave was sealed and 30 atmospheres of initial nitrogen pressure was charged. The autoclave was slowly heated to a temperature of 180° C. during a period of about 4 hours following which an additional heating to 200° C. was maintained for a period of 2 hours. At the end of this time the autoclave and contents thereof were cooled to room temperature, the final pressure being 30 atmospheres. The excess pressure was vented, the autoclave was opened and the reaction mixture was recovered. The solid was filtered from the solvent and Soxhlet-extracted with alcohol. The resulting dark brown extract was treated with decolorizing charcoal, concentrated and cooled. There was obtained tan crystals which showed a decomposition up to 300° C., the crystals comprising 5,6,7,8,9,9-hexachloro-2,2,3,3 - tetracyano - 1,4,5,8 - dimethano-1,2,3,4,4a,5,8,8a-octahydronaphthalene were analyzed with the following results:

Found: Cl, 46.5. Calculated for $C_{16}H_6Cl_6N_4$: Cl, 45.5.

*Example II*

In this experiment 8 grams (0.062 mole) of tetracyanoethylene and 150 cc. of acetone are placed in a condensation flask provided with a stirrer and encased in a cooling bath. The mixture is continuously stirred and cooled to a temperature of about 9° C. until the tetracyano has gone into complete solution. Following this butadiene is pressed in and the temperature of the flask is maintained in a range of from about 10° to about 20° C., said reaction mixture being continuously stirred during the addition of the 1,3-butadiene. At the end of this time stirring is continued for an additional hour following which the flask and contents thereof are allowed to warm to room temperature. The reaction mixture is filtered and n-heptane added to the filtrate. The resulting solution is concentrated by evaporation of the solvent followed by cooling thereof. Upon cooling the desired product comprising 4,4,5,5-tetracyanocyclohexene crystallizes out. The crystals are recovered by separation, the mother liquor is treated with decolorizing carbon, further concentrated and again cooled. Additional crystals to the desired adduct separate out and are recovered.

The 4,4,5,5-tetracyanocyclohexene along with hexachlorocyclopentadiene is placed in the glass liner of a rotating autoclave along with a benzene solvent and a small amount of anhydrous potassium carbonate. The autoclave is sealed and nitrogen pressed in until an initial pressure of about 30 atmospheres is reached. The autoclave is then slowly heated to a temperature of about 180° C. and maintained there at for a period of about 4 hours following which the temperature is raised to 200° C. for an additional period of 2 hours. At the end of this time the autoclave and contents thereof are allowed to cool to room temperature, the excess pressure is vented and the reaction product recovered. The reaction product is filtered and the solid material is Soxhlet-extracted with alcohol. The resulting extract is treated with decolorizing charcoal, concentrated and cooled, the desired product comprising 5,6,7,8,9,9-hexachloro-2,2,3,3-tetracyano - 5,8 - methano-1,2,3,4,4a,5,8,8a-octahydronaphthalene crystallizes out and is recovered.

*Example III*

In this example 8 grams (0.062 mole) of tetracyanoethylene and 150 cc. of acetone are placed in a flask provided with a stirrer, dropping funnel, the flask being immersed in a cooling bath. The mixture is stirred and cooled to a temperature of about 9° C. with complete solution of the tetracyanoethylene being obtained at this point. Following this 20 grams of 1,3-pentadiene (piperylene) is slowly added dropwise during a period of about 0.25 hour, the temperature of the flask being maintained in a range of from about 10° to about 18° C. During the addition the mixture is continuously stirred and stirring is continued for an additional period of 0.5 hour. At the end of this time the flask and contents thereof are allowed to warm to room temperature, the reaction mixture is filtered, the filtrate is extracted with n-heptane following which the extract is concentrated and cooled. The desired product comprising 4,4,5,5-tetracyano-3-methylcyclohexene-1 crystallizes out and is separated. The mother liquor is treated with decolorizing charcoal, again concentrated and cooled, an additional amount of the desired adduct then crystallizing out.

The crystals recovered from the above condensation are combined and placed in a rotating autoclave along with hexachlorocyclopentadiene, a xylene solvent and a small amount of anhydrous potassium carbonate. The autoclave is sealed and nitrogen pressed in until an initial pressure of 30 atmospheres is reached. The autoclave and contents thereof are then heated to a temperature of about 180° C. and maintained thereat during a period of about 4 hours. Following this the autoclave is then heated to 200° C. and maintained thereat for an additional period of 2 hours. At the end of this time the autoclave and contents thereof are cooled to room temperature, the excess pressure is vented and the autoclave is opened. The reaction product is recovered, filtered and the precipitate is Soxhlet-extracted with alcohol. The extract is treated in a manner similar to that set forth in the above examples and the desired product comprising 5,6,7,8,9,9 - hexachloro - 2,2,3,3-tetracyano-5,8-methano-1,2,3,4,4a,5,8,8a-octahydro-1-methylnaphthalene is separated and recovered.

*Example IV*

In this experiment 8 grams of tetracyanoethylene is treated in a manner similar to that set forth in the above examples. Upon complete solution of the tetracyanoethylene 20 grams (0.3 mole) of furan is slowly added dropwise during a period of about 15 minutes, the temperature of the flask being maintained below 20° C. The addition of the furan is accompanied by continuous stirring which, after the completion of the addition of the furan, is continued for an additional period of 0.5 hour. At the end of this time the flask and contents thereof are allowed to warm to room temperature, and the reaction product is filtered. The filtrate is extracted with n-heptane following which the extract is concentrated to remove the solvent and thereafter cooled. Upon cooling the desired adduct comprising 3,6-epoxy-4,4,5,5-tetracyanocyclohexene-1 crystallizes out, is separated and recovered. Treatment of the mother liquor in a manner similar to that hereinbefore set forth will yield additional portions of the desired adduct.

The two batches of adduct which are recovered according to the above paragraph are combined and placed in a glass liner of a rotating autoclave along with hexachlorocyclopentadiene, a benzene solvent and a relatively small amount of anhydrous potassium carbonate. The autoclave is sealed and nitrogen pressed in until an initial pressure of 30 atmospheres is reached. The autoclave is slowly heated to a temperature of 180° C. for a period of 4 hours and thereafter further heated to a temperature of about 200° C. for an additional period of 2 hours.

11

At the end of this time the autoclave and contents thereof are cooled to room temperature, the excess pressure is vented and the autoclave is opened. The reaction product is filtered and the precipitate portion is Soxhlet-extracted with an alcohol. The extract is treated in a manner similar to that set forth in the above examples and the desired product comprising 5,6,7,8,9,9-hexachloro - 2,2,3,3 - tetracyano - 1,4 - epoxy - 5,8 - methano-1,2,3,4,4a,5,8,8a-octahydronaphthalene which crystallizes out upon cooling is separated and recovered.

*Example V*

Tetracyanoethylene and cyclopentadiene are treated in a manner similar to that set forth in Example I above to prepare the desired adduct comprising 5,5,6,6-tetracyano-norborn-2-ene. This adduct which is recovered after treatment in a manner similar to that set forth above is condensed with hexabromocyclopentadiene by placing the starting materials in an autoclave along with a benzene solvent and anhydrous potassium carbonate. The autoclave is sealed and nitrogen pressed in until an initial pressure of 30 atmospheres is reached. The autoclave and contents thereof are slowly heated to a temperature of about 180° C. during a period of 4 hours and then to 200° C. for an additional period of 2 hours. Following this the autoclave and contents thereof are cooled to room temperature, the excess pressure is vented and the reaction product is recovered. The product is treated by filtration, Soxhlet-extraction with an alcohol concentration and cooled, the desired product comprising 5,6,7,8,9,9-bromo-2,2,3,3-tetracyano-1,4,5,8-dimethano - 1,2,3,4,4a,5,8,8a-octahydronaphthalene upon cooling is separated and recovered.

*Example VI*

An insecticidal composition of matter is prepared by dissolving 1 gram of 5,6,7,8,9,9-hexachloro-2,2,3,3-tetracyano - 1,4,5,8 - dimethano - 1,2,3,4,4a,5,8,8a-octahydronaphthalene in 2 cc. of benzene. The solution is added to 100 cc. of water using 1 gram of emulsifying agent. The resulting solution is sprayed into a cage containing houseflies and will cause a 100% knock down. Similar tests using compounds prepared according to the processes of Examples II to V above will show similar results.

I claim as my invention:

1. 5,6,7,8,9,9-hexachloro - 2,2,3,3 - tetracyano-1,4,5,8-dimethano-1,2,3,4,4a,5,8,8a-octahydronapththalene.

2. 5,6,7,8,9,9 - hexachloro - 2,2,3,3, - tetracyano-5,8-methano-1,2,3,4,4a,5,8,8a-octahydronapththalene.

3. 5,6,7,8,9,9-hexachloro - 2,3,3,3 - tetracyano - 5,8-methano-1,2,3,4a,5,8,8a-octahydro - 1 - methylnaphthalene.

4. 5,6,7,8,9,9-hexachloro - 2,2,3,3 - tetracyano-1,4-epoxy-5,8-methano - 1,2,3,4,4a,5,8,8a - octahydronaphthalene.

5. 5,6,7,8,9,9-hexabromo - 2,2,3,3 - tetracyano-1,4,5,8-dimethano-1,2,3,4,4a,5,8,8a-octahydronaphthalene.

6. A compound having the formula:

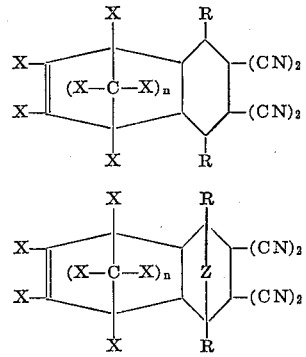

wherein X is hydrogen, chlorine or bromine, at least one X being chlorine or bromine, R is hydrogen, chlorine, bromine or alkyl containing from 1 to about 3 carbon atoms, Z is a member selected from the group consisting of methano, ethano, oxy and thioxy, and $n$ is an integer of from 1 to 2.

References Cited by the Examiner
UNITED STATES PATENTS

| | | | |
|---|---|---|---|
| 2,635,979 | 4/1953 | Lidou | 260—346.6 |
| 2,733,248 | 1/1965 | Lidou | 260—346.2 |

OTHER REFERENCES

Middleton et al.: "J. Amer. Chem. Soc.," vol. 80 (1958), pp. 2783–88.

NICHOLAS S. RIZZO, *Primary Examiner.*

HENRY R. JILES, *Examiner.*